A1

US006197422B1

(12) United States Patent
Murphy et al.

(10) Patent No.: US 6,197,422 B1
(45) Date of Patent: Mar. 6, 2001

(54) RIBBON ASSEMBLIES AND RADIATION-CURABLE INK COMPOSITIONS FOR USE IN FORMING THE RIBBON ASSEMBLIES

(75) Inventors: Edward J. Murphy, Arlington Heights; Edward P. Zahora, Naperville, both of IL (US); Johannes C. van den Burg, Hoek van Holland (NL)

(73) Assignee: DSM, N.V., Heerlen (NL)

( * ) Notice: Subject to any disclaimer, the term of this patent is extended or adjusted under 35 U.S.C. 154(b) by 0 days.

(21) Appl. No.: 09/158,134

(22) Filed: Sep. 22, 1998

Related U.S. Application Data

(63) Continuation-in-part of application No. 09/073,426, filed on May 6, 1998, now abandoned
(60) Provisional application No. 60/045,746, filed on May 6, 1997.

(30) Foreign Application Priority Data

Dec. 30, 1997 (NL) .................................................. 1007933

(51) Int. Cl.⁷ ................................. D02G 3/00; H04N 5/91
(52) U.S. Cl. .......................... 428/378; 428/375; 428/392; 385/123; 385/145; 522/12; 522/90
(58) Field of Search .................. 522/90, 12; 428/375, 428/378, 392; 385/145, 123

(56) References Cited

U.S. PATENT DOCUMENTS

| | | | |
|---|---|---|---|
| 3,926,641 | * | 12/1975 | Rosen ..................................... 96/115 |
| 4,624,994 | | 11/1986 | Ansel . |
| 4,629,285 | | 12/1986 | Carter . |
| 4,682,851 | | 7/1987 | Ansel . |
| 4,782,129 | | 11/1988 | Moschovis . |
| 4,794,133 | | 12/1988 | Moschovis . |
| 4,806,574 | | 2/1989 | Krajewski . |
| 4,844,604 | | 7/1989 | Bishop . |
| 4,849,462 | | 7/1989 | Bishop . |
| 4,900,126 | | 2/1990 | Jackson . |
| 4,906,067 | | 3/1990 | Mayr . |
| 4,953,945 | | 9/1990 | Nishimura . |
| 5,011,260 | | 4/1991 | Marx . |
| 5,178,952 | * | 1/1993 | Yamamoto et al. .............. 428/425.8 |
| 5,219,896 | | 6/1993 | Coady . |
| 5,259,060 | | 11/1993 | Edward . |
| 5,336,563 | | 8/1994 | Coady . |
| 5,373,578 | | 12/1994 | Parker . |
| 5,377,292 | | 12/1994 | Bartling . |
| 5,524,164 | | 6/1996 | Hattori . |
| 5,539,849 | | 7/1996 | Petisce . |
| 5,561,730 | | 10/1996 | Lochkovic . |
| 5,607,985 | * | 3/1997 | Masuhara et al. ..................... 522/28 |
| 5,621,838 | | 4/1997 | Nomura . |
| 5,777,024 | * | 7/1998 | Killilea et al. ........................ 524/590 |
| 5,787,218 | * | 7/1998 | Ohtaka et al. ........................ 385/123 |
| 5,847,021 | * | 12/1998 | Tortorello et al. ..................... 522/90 |
| 5,874,041 | * | 2/1999 | Matsumura et al. .................. 264/401 |
| 5,932,625 | * | 8/1999 | Watanabe et al. ..................... 522/33 |

FOREIGN PATENT DOCUMENTS

| | | |
|---|---|---|
| 4007 519 | 3/1990 | (DE) . |
| 0194 891 A1 | 9/1986 | (EP) . |
| 0 262 340 A2 | 4/1988 | (EP) . |
| 0 345 968 A2 | 12/1989 | (EP) . |
| 0 407 004 A2 | 1/1991 | (EP) . |
| 0 527 266 A1 | 2/1993 | (EP) . |
| 0 614 099 A2 | 9/1994 | (EP) . |
| 0 699 933 A2 | 3/1996 | (EP) . |
| 0 753 777 A2 | 1/1997 | (EP) . |
| 0 780 712 A2 | 6/1997 | (EP) . |
| 2 672 699 A1 | 8/1992 | (FR) . |
| 2 259 704 A1 | 3/1993 | (GB) . |
| 69-177159 | 1/1989 | (JP) . |
| 62-311609 | 6/1989 | (JP) . |
| 4057 814 | 6/1990 | (JP) . |
| H3-35210 | 2/1991 | (JP) . |
| 3067 208 | 6/1991 | (JP) . |
| WO90/13579 A1 | 11/1990 | (WO) . |
| WO97/05515 A1 | 2/1997 | (WO) . |
| WO97/16469 A1 | 5/1997 | (WO) . |
| WO97/18493 A1 | 5/1997 | (WO) . |
| WO97/19029 A1 | 5/1997 | (WO) . |

OTHER PUBLICATIONS

K.W. Jackson, et al., "The Effect of Fiber Ribbon Component Materials on Mechanical and Environmental Performance", 28 International Wire & Symposium Proceedings (1993).
H.C. Chandon, et al., "Fiber Protective Design for Evolving Telecommunication Applications", International Wire & Symposium Proceedings (1992).
J.R. Toler, et al., "Factors Affecting Mechanical Stripping of Polymer Coatings From Optical Fibers", International Wire & Cable Symposium Proceedings (1989).
W. Griffioen, "Strippability of Optical Fibers", EFOC & N, Eleventh Annual Conference, Hague (1993).

* cited by examiner

*Primary Examiner*—William Krynski
*Assistant Examiner*—J. M. Gray
(74) *Attorney, Agent, or Firm*—Jeffrey S. Melcher; Farkas & Manelli, PLLC

(57) ABSTRACT

Provided is a ribbon assembly having the functional capability of providing break-out of ink coated or colored outer primary coated optical glass fibers from the ribbon assembly. The ink coating or colored outer primary coating is formulated from a benzophenone compound and at least about 1 wt. % of a homolytic photoinitiator to provide a level of adhesion between the ink coating or colored outer primary coating and matrix material which is less than the level of adhesion between the ink coating or colored outer primary coating and an adjacent underlying coating. Also provided are ink coating and colored outer primary coating compositions adapted to form ink coatings and colored outer primary coatings suitable for use on optical glass fibers contained in a ribbon assembly.

13 Claims, No Drawings

RIBBON ASSEMBLIES AND RADIATION-CURABLE INK COMPOSITIONS FOR USE IN FORMING THE RIBBON ASSEMBLIES

This application is a Continuation-in-Part of U.S. Ser. No. 09/073,426, filed on May 6, 1998 now abandoned. This application claims priority to Netherlands Application No. 1007933, filed on Dec. 30, 1997, and to U.S. provisional patent application Ser. No. 60/045,746, filed on May 6, 1997 now abandoned.

FIELD OF THE INVENTION

The invention relates to ribbon assemblies which provide the functional capability of break-out of the individual coated optical glass fibers. Also provided are radiation-curable ink compositions that are suitable for use in forming the ribbon assemblies.

BACKGROUND OF THE INVENTION

Optical glass fibers are generally coated with two superposed radiation-cured coatings, which together form a primary coating. The coating which is in direct contact with the glass is called the inner primary coating and the overlaying coating is called the outer primary coating.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating, which is on the exposed surface of the coated fiber, is typically a relatively harder coating designed to provide a desired resistance to physical handling forces, such as those encountered when the fiber is cabled.

In telecommunications applications of optical fibers, multiple individual strands of coated fiber are usually packaged into larger structures, such as ribbon assemblies to maximize efficiency. However, after ribboning of fiber, the individual strands of fiber must be readily distinguishable from each other to provide individual identification during, for example, installation and repair. Color coding can be used to distinguish and identify individual fibers in a complex cable. Although several methods can be used to color code fiber, color coding can be done advantageously using a thin ink layer, such as from about 3 to about 10 microns, which is placed over the coated fiber before ribboning and cabling. Alternatively, a colorant can be incorporated into the outer primary coating to provide a colored outer primary coating.

Tape-like ribbon assemblies are prepared by embedding a plurality of individual color coded fibers in a supporting matrix material which, like the inner and outer primary coatings, is also radiation-curable to maximize production speed. Such ribbon assemblies usually contain from about 4 to about 12 color coded fibers. Cure of the matrix material occurs during the ribboning stage after the fibers have been color coded by ink. Hence, in a ribbon design, the ink layer resides between the ribbon's matrix material and the fibers' outer primary coating. This means that the ink layer's interfacial characteristics (e.g., surface energy, adhesion) must be carefully controlled to function properly with both matrix material and outer primary coating in the ribbon structure. If a colored outer primary coating is utilized in place of an ink coating, the colored outer primary layer's interfacial characteristics (e.g., surface energy, adhesion) must be carefully controlled to function properly with the matrix material and inner primary coating in the ribbon structure. In particular, the ability of a cured matrix material to be suitably stripped off the ink layer or colored outer primary coating, referred to as "break-out, is an important technical consideration. Break-out is generally carried out by a mechanical force, although chemical softening of the matrix with use of solvents is also known.

The term "ribbon assembly" as used herein includes the tape-like ribbon assembly described above, as well as optical glass fiber bundles. Optical glass fiber bundles can be, for example, a substantially circular array having at least one central fiber surrounded by a plurality of further optical glass fibers. Alternatively, the bundle may have other appropriate cross-sectional shapes such as square, trapezoid, etc.

Optical fiber color coding can be based on up to 12 or more colors. Although optical fiber inks were originally solvent-based or thermosetting inks, in more recent times, radiation-curable inks have been used to increase the speed of the inking process. In these ink compositions, pigment is dispersed in a radiation-curable carrier or base composition. In addition, ink compositions should not contain ingredients that can migrate to the surface of the optical glass fiber and cause corrosion. The ink composition should also not contain ingredients which can cause instability in the protective coatings or matrix material. Ink coatings for optical glass fibers should be color fast for decades, not cause attenuation of the signal transmission, be impervious to cabling gels and chemicals, and allow sufficient light penetration for fiber core alignment.

From the above, it is clear that optical glass fiber technology places many unique demands on radiation-curable ink compositions which more conventional technologies, such as printing inks, do not.

U.S. Pat. No. 4,900,126 (Jackson) discloses an optical glass fiber ribbon unit in which each of the individually coated optical glass fibers has a colored outer layer. Each of the optical glass fibers is further coated with a release agent which has a low affinity for the bonding material or the colorant material. An example of the release agent is teflon. The release agent creates a weak boundary layer at the interface of the colorant material and the matrix material whereby the matrix can be separated from the optical glass fibers without removing the colored layer on the individual optical glass fibers.

Published Japanese Patent Application No. H1-152405 discloses a radiation-curable ink composition containing an organic polysiloxane compound. The polysiloxane compound provides the ink coating with the ability to separate more easily from the matrix material in a ribbon assembly.

Published Japanese Patent Application No. 64-22976 discloses radiation-curable ink compositions containing specific radiation-curable oligomers. The ink composition provides an ink coating having adhesion to the outer primary coating which is separable from the matrix material in a ribbon assembly.

Published Patent application EP-A-614099 describes the use of a release agent such as a silicon oil or a fluororesin between the bundling layer and the coloring layer. When substantial amounts of silicone resins are used, incompatibility in the liquid and resultant imperfections in the cured matrix composition may result, which can lead to undesirable attenuation of signal light transmission.

There is a need for a ribbon assembly which is capable of providing break-out of the individual coated optical glass fibers, without requiring the use of a release agent.

SUMMARY OF THE INVENTION

An objective of the present invention is to provide ribbon assemblies having suitable break-out performance.

Another objective of the present invention is to provide radiation-curable ink compositions (hereinafter "ink coating composition") which are adapted to provide cured ink coatings having greater adhesion to the outer primary coating than to a matrix material, to provide the ribbon assembly with the capability of break-out of the individual coated optical glass fibers.

A further objective of the present invention is to provide radiation-curable colored outer primary coating compositions (hereinafter "colored outer primary coating composition") which are adapted to provide cured colored outer primary coatings having greater adhesion to the adjacent underlying coating than to a matrix material, to provide the ribbon assembly with the capability of break-out of the individual coated optical glass fibers.

The above objectives and other objectives can be obtained by the following. Provided is a novel ribbon assembly having the functional capability of providing break-out of individual coated optical glass fibers from the ribbon assembly. The ribbon assembly comprises:

a plurality of coated optical glass fibers; and a matrix material binding the plurality of coated optical fibers together. At least one of the coated optical glass fibers comprises a coated optical glass fiber containing an ink coating or a colored outer primary coating formulated from a radiation-curable coating composition comprising:

a radiation-curable carrier system containing a radiation-curable monomer, a radiation-curable oligomer, a benzophenone compound and at least about 1 wt. % of a homolytic photoinitiator, based on the total weight of the coating composition; and a pigment dispersed in said radiation-curable carrier system.

Also provided is a novel ink coating composition comprising:

a radiation-curable carrier system containing a mixture of radiation-curable monomers and oligomers, a benzophenone compound and at least about 1 wt. % of a homolytic photoinitiator, based on the total weight of the ink coating composition; and a pigment dispersed in the radiation-curable carrier system.

The present invention further provides a novel colored outer primary coating composition comprising:

a radiation-curable carrier system containing a mixture of radiation-curable monomers and oligomers, a benzophenone compound and at least about 1 wt. % of a homolytic photoinitiator, based on the total weight of the colored outer primary coating composition; and a pigment dispersed in the radiation-curable carrier system.

DETAILED DESCRIPTION OF THE INVENTION

Provided are novel ribbon assemblies containing a plurality of coated optical glass fibers which are bound together by a matrix material. The coated optical glass fibers each have an ink coating for identifying the individual fibers. The level of adhesion between the ink coating and the matrix material is less than the level of adhesion between the ink coating and the secondary coating on the optical glass fiber, which provides the functional capability of providing break-out of the individual coated optical glass fibers. Unexpectedly, the use of a benzophenone compound in combination with at least about 1 wt. % of a homolytic photoinitiator results in an ink coating having a level of adhesion to an outer primary coating that is greater than the level of adhesion to the matrix material, which provides the ribbon assembly with the functional capability of break-out of the individual coated optical glass fibers from the matrix material.

Ink coating compositions generally comprise at least one pigment dispersed in a radiation-curable carrier. The ink coating compositions suitable for use in forming ribbon assemblies according to the present invention can be based on any known ink composition for coating and identifying coated optical glass fibers. The conventional ink compositions can become the improved ink composition according to the present invention by incorporating a benzophenone compound in combination with a homolytic photoinitiator. Commercial examples of suitable ink coating compositions that can be reformulated according to the present invention include the radiation-curable inks available from DSM Desotech, Inc., which are mainly based on multi-functional acrylate monomers.

Besides benzophenone, the term benzophenone compound includes substituted benzophenones having a molecular weight of from about 170 to about 500. Suitable substituents include alkyl groups, acryl groups, aromatic groups, halogens, and the like. Examples of suitable benzophenone compounds include:

benzophenone;

chlorobenzophenone;

methyl-o-benzoyl benzoate;

4-benzoyl4'-methyldiphenylsulphide;

acrylated benzophenone;

4-phenylbenzophenone;

3,3'-dimethyl-4-methoxybenzophenone; and 4,4'-dimethylamino-benzophenone.

Preferably, the benzophenone compound is substantially free-of a ring-bonded benzophenone. Ring-bonded benzophenones such as thioxanthone or derivatives thereof, in particular 2,4-diethyl- or 9-isopropyl-thioxanthone, appear to provide significantly less improvement of break-out properties in comparison to non ring-bonded benzophenone compounds.

The benzophenone compound should be present in an amount which provides a level of adhesion between the inner primary coating and outer primary coating that is greater than the level of adhesion between the ink coating and the matrix material. Suitable amounts of benzophenone compounds are from about 1 wt. % to about 20 wt. %, preferably from about 2 wt. %. to about 15 wt. %, and more preferably from about 2 wt. % to about 10 wt. %, based on the total weight of the ink coating composition.

Usually, benzophenone must be used in combination with an amine compound which is capable of donating hydrogen. However, it has now been found that unexpectedly good results can be obtained without the use of usual amine compounds. Morpholino-type sensitizers, which are not usually utilized as hydrogen donating amine compounds, can be used advantageously with the benzophenone compound. Suitable amounts of morpholino-type sensitizers include from about 0.1 to about 5 wt. %, preferably from about 0.1 wt. % to about 3 wt. %, based on the total weight of the ink coating composition.

The homolytic photoinitiator is a homolytic fragmentation photoinitiator, which operates by intramolecular bond cleavage, and is sometimes referred to as a Norrish type I initiator. Homolytic photoinitiators generate free-radical species of themselves. Examples of suitable homolytic photoinitiators include:

2,4,6 trimethylbenzoyl diphenylphosphine-oxide;

bis(2,6-dimethoxybenzoyl)-2,4,4-trimethylpentyl-phosphine oxide;

1-hydroxycyclohexylphenyl ketone;

2-benzyl-2-dimethylamino-1-(4-morpholinophenyl)-butan-1-one;

2,2-dimethoxy-2-phenylacetophenone;

2-methyl-1-(4-(methylthio)phenyl)-2-(4-morpholinyl)-1-propanone;

2-hydroxy-2-methyl-1-phenyl propan-1-one;

4-(2-hydroxyethoxy)phenyl-2-hydroxy-2-propyl ketone 1-(4-isopropylphenyl)-2-hydroxy-2-methylpropan-1-one;

1-(4-dodecyl-phenyl)-2-hydroxy-2-methylpropan-1-one;

4-(2-hydroxyethoxy)phenyl-2(2-hydroxy-2-propyl)-ketone;

diethoxyphenyl acetophenone;

a mixture of (2,6-dimethoxy benzoyl)-2,4,4 trimethylpentylphosphineoxide and 2-hydroxy-2-methyl-1-phenyl-propan-1-one;

1-propanone, 2-methyl-1-1-(4-(methylthio)phenyl) 2-(4-morpholinyl); and mixtures of these.

Preferably, a benzoyl diaryl phosphine oxide type photoinitiator is present, such as 2,4,6 trimethylbenzoyl diphenylphosphine-oxide or bis(2,6-dimethoxybenzoyl)-2,4,4-trimethylpentyl-phosphine oxide. For an enhanced cure speed, a benzoyl diaryl phosphine oxide type photoinitiator can be combined with other photointitiators, such as 1-hydroxycyclohexylphenyl ketone.

Suitable amounts of the homolytic photoinitiator are from about 1 to about 20 wt. %, preferably from about 3 to about 15 wt. %, and more preferably from about 4 to about 12 % by weight, based on the total weight of the ink coating composition.

Ink coatings are usually about 3 to about 10 microns thick, and should be concentric to prevent attenuation of the signal transmission. The ink coating also generally has a Tg of at least about 30° C., more preferably at least about 50° C. One of ordinary skill in the art of formulating radiation-curable ink compositions knows how to adjust the radiation-curable composition to provide the desired properties of the cured coating. Thus, radiation-curable compositions which are usually used for forming outer primary coating compositions can be reformulated and utilized as the radiation-curable carrier system in the ink composition according to the present invention. Examples of suitable radiation-curable compositions which may be reformulated variously include those which are disclosed in U.S. Pat. Nos. 4,624,994; 4,682,851; 4,782,129; 4,794,133; 4,806,574; 4,849,462; 5,219,896; and 5,336,563, all of which are incorporated herein by reference.

Radiation-curable carrier systems which are suitable for forming the present ink composition contain one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, -vinyl amide, maleate esters, and fumarate esters. Preferably, the ethylenic unsaturation is provided by a group containing acrylate, methacrylate, or styrene functionality. Preferably, at least about 80 mole %, more preferably, at least about 90 mole %, and most preferably substantially all of the radiation-curable functional groups present in the oligomer are acrylate or methacrylate.

A mixture of mono-, di-, tri-, tetra-, and higher functionalized oligomers can be used to achieve the desired balance of properties, wherein the functionalization refers to the number of radiation-curable functional groups present in the oligomer.

The oligomers usually comprise a carbon-containing backbone structure to which the radiation-curable functional group(s) are bound. Examples of suitable carbon-containing backbones include polyethers, polyolefins, polyesters, polyamides, and polycarbonates. The size of the carbon-containing backbone can be selected to provide the desired molecular weight. The number average molecular weight of the oligomer is usually between about 500 to about 10,000, preferably between about 500 to about 7,000, and most preferably between about 1,000 to about 5,000.

For example, the carbon-containing backbone of the oligomer can comprise aromatic groups and ring-opened epoxy groups or alkoxy groups. The oligomer can be represented by, for example:

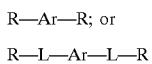

where

R is a radiation-curable functional group,

Ar is an aromatic group containing moiety, and

L is a linking group.

Examples of suitable linking groups include alkoxy or ring opened epoxy such as ethoxy, propoxy, butoxy, and repeat units thereof. L can also be a urethane or urea linking group.

The aromatic groups can be, for example, derived from bisphenol units, such as bisphenol A. A preferred oligomer is a diglycidyl ether derivative of bisphenol A to which acrylate functional groups have been bound. Another example of a preferred oligomer is a trifunctional polyether or polyester having a molecular weight of about 500 to about 5000.

The oligomer can be present in an amount of from about 1 to about 80 wt. %, preferably from about 10 to about 70 wt. %, and more preferably from about 20 to about 60 wt. %, based on the total weight of the ink coating composition.

The radiation-curable carrier systems may also contain a reactive diluent which is used to adjust the viscosity. Preferably, the reactive diluent has a molecular weight of about 550 or less and a viscosity of about 500 mPa.s (25° C.) or less. The reactive diluent can be a low viscosity monomer containing having at least one functional group capable of polymerization when exposed to actinic radiation. This functional group may be of the same nature as that used in the radiation-curable monomer or oligomer. Preferably, the functional group present in the reactive diluent is capable of copolymerizing with the radiation-curable functional group present on the radiation-curable monomer or oligomer.

For example, the reactive diluent can be a monomer or mixture of monomers having an acrylate or vinyl ether functionality and an $C_4$–$C_{20}$ alkyl or polyether moiety. Particular examples of such reactive diluents include:

hexylacrylate, 2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone,
and the like.

Another type of reactive diluent that can be used is a compound having an aromatic group. Particular examples of reactive diluents having an aromatic group include: ethyleneglycolphenylether-acrylate, polyethyleneglycolphenyletheracrylate, polypropyleneglycolphenyletheracrylate, and alkyl-substituted phenyl derivatives of the above monomers, such as polyethyleneglycolnonylphenyl-etheracrylate.

The reactive diluent can also comprise a diluent having two or more functional groups capable of polymerization. Particular examples of such monomers include:

$C_2-C_{18}$ hydrocarbon-dioldiacrylates,
$C_4-C_{18}$ hydrocarbondivinylethers,
$C_3-C_{18}$ hydrocarbon triacrylates, and the polyether analogues thereof, and the like, such as
1,6-hexanedioldiacrylate,
trimethylolpropanetri-acrylate,
hexanedioldivinylether,
triethylene-glycoldiacrylate,
pentaerythritol-triacrylate,
ethoxylated bisphenol-A diacrylate, and
tripropyleneglycol diacrylate.

Suitable amounts of reactive diluent are from about 1 to about 80 wt. %, preferably, from about 5 to about 60 wt. %, and more preferably from about 10 to about 50 wt. %, based on the total weight of the ink coating composition.

Other additives which can be used in the radiation-curable carrier system include, but are not limited to catalysts, lubricants wetting agents, antioxidants and stabilizers. The selection and use of such additives is within the skill of the art.

Preferably, a lubricant is incorporated into the ink coating composition to provide further improved break-out of the individual coated optical glass fibers from the matrix material, when used to form ink coatings on coated optical glass fibers contained in a ribbon assembly. Suitable lubricants include silicones, fluorocarbon oils or resins and the like. The lubricant can be present in amount of from about 0.01 to about 10 wt %, more preferably about 0.1 to about 5 wt %, and most preferably about 0.1 to about 3 wt %, based on the total weight of the ink coating composition. Preferably, a silicone oil or functionalized silicone compound, such as silicone diacrylate, is used as a lubricant.

Any inorganic and organic pigment that is suitable for making radiation-curable ink compositions can be used in the present invention. The use of the term "pigment" refers to both inorganic and organic pigments. The pigment preferably has a mean particle size of about 1 μm or less. The particle size of commercial pigments can be reduced by milling if necessary. Preferably, the pigment is utilized in the form of a pigment dispersion in order to simplify dispersion of the pigment within the ink coating composition. The pigment dispersion usually comprises one or more pigments dispersed in a low viscosity liquid, such as a reactive diluent, in such an amount that the pigment dispersion is easily pourable under ambient temperatures. For example, amounts of about 1 to about 80% by weight pigment dispersed in a reactive diluent have been found to be suitable. Pigment dispersions are well known and therefore one skilled in the art will be able to utilize well known pigment dispersions to formulate improved ink compositions according to the present invention based on the disclosure provided herein Preferably, the pigment is an organic pigment.

Ribbon assemblies utilizing 12 or less coated optical glass fibers require only 12 colors to adequately distinguish each of the coated optical fibers from one another. However, in larger ribbon assemblies, more than 12 colors may be utilized to adequately distinguish the coated optical glass fibers from one another. Examples of twelve colors normally used for making ribbon assemblies include: black, white, yellow, blue, red, green, orange, brown, pink, aqua, violet, and gray.

A specific example of a suitable black pigment includes carbon black.

A specific example of a suitable white pigment includes titanium dioxide.

Specific examples of suitable yellow pigments include diarylide yellow and diazo based pigments.

Specific examples of suitable blue pigments include phthalocyanine blue, basic dye pigments, and phthalocyanines.

Specific examples of suitable red pigments include anthraquinone (red), napthole red, monoazo based pigments, quinacridone pigments, anthraquinone, and perylenes.

Specific examples of suitable green pigments include phthalocyanine green and nitroso based pigments.

Specific examples of suitable orange pigments include monoazo and diazo based pigments, quinacridone pigments, anthraquinones and perylenes.

Specific examples of suitable violet pigments include quinacrinode violet, basic dye pigments and carbazole dioxazine based pigments.

Suitable aqua, brown, gray, and pink pigments can easily be formulated by combining other colors. One skilled in the art is able to form any color as desired by combining different.

The pigment can be present in the ink composition in an amount that provides coloration that is visible without magnification to facilitate identification of the individual colored optical glass fiber. The amount of the pigment should not be so great as to significantly reduce the cure speed of the ink composition or result in other undesirable affects. Examples of suitable amounts of pigment have been found to be from about 1 to about 20 weight %, preferably about 1 to about 15 weight %, more preferably about 1 to about 10 weight %, based on the total weight of the ink composition.

Based on the above, a suitable radiation-curable ink composition can be formulated from a composition containing:

from about 1 to about 20 wt. % of at least one pigment;
from about 1 to about 20 wt. % of at least one benzophenone compound; from about 1 to about 20 wt. % of at least one homolytic photoinitiator; and
from about 1 to about 80 wt. % of an oligomer; and from about 1 to about 80 wt. % of a reactive diluent monomer.

The examples of polymeric coating compositions set forth above are intended only to be illustrative of the coating compositions that may be employed in the present invention. The compositions according to the invention can be applied on an optical fiber using conventional coating technology. An example of a suitable method is disclosed in U.S. Pat. No. 4,629,285, the complete disclosure of which is incorporated herein by reference. The ink composition can also be applied in a manner similar to the application of the outer primary coating on an optical glass fiber drawing and coating tower.

Ink coatings are usually about 3 to about 10 microns thick and are usually concentric to prevent attenuation of the signal transmission. However, if desired, the ink coating can be applied in any form suitable to provide visible color identification of the individual coated optical glass fibers. Examples of suitable coatings include dashes, dots, lines, and rings. Preferably, the ink coating is substantially concentric. The ink coating compositions according to the present invention are capable of providing substantially concentric ink coatings, as well as discontinuous coatings such as dashes, dots, lines, and rings. When less than a concentric coating is applied, the benzophenone compound can be utilized to provide separation of the matrix material from the dotted, dashed, or otherwise applied ink coating.

Radiation-cure of ink coatings can be conducted using radiation sources which have characteristic emission outputs that depend on the radiation source. Exemplary radiation sources can be obtained from, for example, Fusion UV Systems Inc. or Iwasaki Denki Co. For example, so-called "D-lamps" and "H-lamps" can be used as a radiation source, wherein the D lamp is more rich in longer wavelength ultraviolet light emissions than the H lamp. A typical ultraviolet radiation source, such as medium pressure arc lamp, used in industrial production often has major emission lines near the 260, 300, 313, and 366 nm ranges, or more generally at about 250–270 nm, at about 290–320 nm, and at about 360–380 nm. In addition, there can be a line at about 390–410 nm. The characteristic bulb output used in the present invention can be measured by conventional methods or obtained from the supplier of the radiation source. Preferably, the ink composition of the present invention is cured by irradiation with both an H and a D lamp.

For applications where a colored outer primary coating is utilized in place of or in combination with an ink coating, such as when less than a concentric ink coating is applied, the benzophenone compound in combination with at least about 1 wt. % of a homolytic photoinitiator can be incorporated into the colored outer primary coating to provide the desired level of adhesion between the colored outer primary coating and a matrix material. Based on the disclosure provided herein, one skilled in the art will be able to formulate the desired colored outer primary coating utilizing the benzophenone compound in combination with at least about 1 wt. % of a homolytic photoinitiator. For example, since the radiation-curable base of outer primary coatings is similar to the radiation-curable carrier systems of ink coatings the benzophenone compound and homolytic photiniator can be incorporated into colored outer primary coating compositions using the amounts described herein in reference to the ink coating compositions. Thus, the adhesion properties of the outer primary coatings can be adjusted in the same manner as the ink coatings described herein by utilizing the benzophenone compound and homolytic photiniator. Conventional colored outer primary coatings can become the improved colored outer primary coatings according to this invention by incorporating the benzophenone compound and homolytic photoinitiator therein. Examples of suitable colored outer primary coatings are disclosed in published PCT application WO 90/13579, the complete disclosure of which is incorporated herein by reference. Alternatively, conventional outer primary coatings can become the improved colored outer primary coating according to the present invention by incorporating therein at least one pigment, a benzophenone compound and homolytic photointiator.

The novel ribbon assembly made according to this invention can be used in telecommunication systems. Such telecommunication systems typically include ribbon assemblies containing optical glass fibers, transmitters, receivers, and switches. The ribbon assembly containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assembly containing the coated optical glass fibers are the fundamental connecting units of such cable television systems. The ribbon assembly can be buried underground or water for long distance connections, such as between cities. The ribbon assembly can also be used to connect directly to residential homes.

The invention will be further explained by the following non-limiting examples.

EXAMPLE I

An ink coating composition was prepared by combining the following components:

| Component: | Percent by weight of total composition: |
| --- | --- |
| Epoxy Acrylate Oligomer | 56.03 |
| Alkoxylated Aliphatic Diacrylate | 32.97 |
| Irgacure 819 (Ciba Geigy) | 1.10 |
| 2-Methyl-1-(4-(Methylthio)Phenyl) 2-(4-Morpholinyl)1-Propanone | 3.30 |
| Benzophenone | 4.40 |
| Pigment Dispersion | 1.65 |
| BYK 333[1] | 0.55 |

[1]BYK 333 is a polyether modified dimethyl polysiloxane.

EXAMPLE 2

Another ink coating composition was prepared by combining the following components:

| Component: | Percent by weight of total composition: |
| --- | --- |
| Polyether Urethane Acrylate: | 49.38 |
| Ethoxylated Bisphenol-A Diacrylate | 20.58 |
| N-vinyl Caprolactam | 20.58 |
| trimethylolpropanetri-acrylate | 3.29 |
| 2,4,6-trimethylbenzoyldiphenylphosphine oxide | 1.65 |

-continued

| Component: | Percent by weight of total composition: |
|---|---|
| Benzophenone | 2.88 |
| Pigment Dispersion | 1.23 |
| Silicone Oil[1] | 0.41 |

[1]silicone oil = Dow Corning 57/Dow Corning 190 mixture, whereby Dow Corning 57: polyether modified dimethyl polysiloxane, and Dow Corning 190: siliconeglycol copolymer To test the ink compositions, glass plates were coated with a 75 micron thick, outer primary coating which was cured by exposure to UV radiation from a D-lamp (1 J/cm$^2$). Next, 75 micron thick drawdowns of the ink compositions, shown in examples I and 2, were applied to the outer primary coated glass plates, and then irradiated with ultraviolet light by a combination of a D lamp with an energy of 1000 mJ/cm$^2$ in the wavelength area up to 450 nm and a H lamp with an energy of 500 mJ/cm$^2$ in the wavelength area from 200 to 400 nm to produce cured ink films.

With these test plates, the adhesion of the ink to the outer primary coating was determined.

In order to test the break-out of the matrix material from the inks, a matrix coating material was applied to ink coated glass plates. The matrix coating material was cured using a D-lamp at 1 J/cm$^2$.

The cured inks, described in the examples I and 2, showed a good adhesion to the outer primary coating and a good break-out from the matrix material.

COMPARATIVE EXAMPLE A

The composition of Example 2, without benzophenone, was tested in the same manner as Examples 1 and 2. The results are shown in Table 1.

EXAMPLE 3

The composition of Example 2, with the addition of 3% of a difunctional acrylated silicone, was tested in the same manner as Examples 1 and 2. The results are shown in Table 1.

EXAMPLE 4

A composition was prepared by combining the following components. This composition can be used as a colored secondary coating.

| Component: | Percent by weight of total composition: |
|---|---|
| Polyether Based Urethane Acrylate | 20.6 |
| Polyether Based Urethane Acrylate | 18.8 |
| Isobornyl Acrylate | 13.2 |
| Ethoxylated Trimethylol Propane Triacrylate | 16 |
| Ethoxylated Bisphenol A Diacrylate | 15 |
| 2-Methyl-1-(4-(Methylthio)Phenyl) 2-(4-Morpholinyl)1-Propanone | 2.8 |
| Irgacure 819 | 0.95 |
| Pigment Dispersion | 2.85 |
| 1,6-Hexamethylene Diacrylate | 2.8 |
| Benzophenone | 4 |
| Silicone Diacrylate | 3 |

TABLE 1

| Sample | Release of Matrix From Ink | Adhesion of Ink to Outer Primary Coating |
|---|---|---|
| Comparative Example A | --- | + |
| Example 2 | ++ | +− |
| Example 3 | ++ | +−− |
| Example 4 | ++ | +− |

As can be seen from the test results shown in Table 1, the use of benzophenone in combination with a homolytic photoinitiator in an ink coating composition containing silicone diacrylate provided suitable break-out properties. However, the presence of a difunctional acrylated silicone and a homolytic photoinitiator in an ink coating composition, no benzophenone, did not provide suitable break-out.

Furthermore, these experiments demonstrate that the use of benzophenone in combination with a homolytic photoinitiator substantially improves the break out of the matrix material from different types of ink coating compositions containing various lubricants.

EXAMPLE 5 AND COMPARATIVE EXAMPLE B

A radiation-curable carrier systems were first formed by combining the components shown in Table 2.

TABLE 2

| Carrier System A | |
|---|---|
| Component | Amount (% by weight of total system) |
| Epoxy Acrylate Monomer | 33.9 |
| Aliphatic Urethane Diacrylate Oligomer | 19.9 |
| Pentaerythritol Tetra-acrylate | 9.95 |
| Isobornyl Acrylate | 3.06 |
| 1,6-Hexanediol Diacrylate | 13.64 |
| Silicone Diacrylate | 1.14 |
| 2,6-di-tert-Butyl-Methyl-Phenol | 0.57 |
| 2-Methyl-1-(4-(Methylthio)phenyl)-2-(4-Morpholinyl)-1-Propanone | 4.55 |
| CGI 819 (Ciba Geigy) | 1.14 |
| Acylated Benzophenone | 9.09 |

The radiation-curable carrier system A was combined with the pigment dispersions shown in Table 3 to form radiation-curable ink coating compositions. For comparison, the commercially available radiation-curable ink coating compositions (DSM Desotech, Inc.) shown in Table 4 were utilized. The commercially available radiation-curable ink coating compositions contained about 1 % silicone diacrylate.

Sample ink coatings were formed on an outer primary coating and then a matrix material was formed on the ink coatings. The Mid-Span Access and Adhesion to Outer Primary Coating properties of the films were tested and the results are shown in Tables 3 and 4.

TABLE 3

| Component (weight % based on total weight of composition) | White | Red | Violet | Yellow | Rose | Black | Slate | Orange | Blue | Green | Brown | Aqua |
|---|---|---|---|---|---|---|---|---|---|---|---|---|
| Radiation-Curable Carrier System (A) | 86.37 | 78.14 | 83.77 | 79.8 | 83 | 89.29 | 88.27 | 81.64 | 88 | 85.5 | 81.79 | 85.35 |
| Pigment Dispersion | 13.63 | 21.86 | 16.23 | 20.2 | 17 | 10.71 | 11.73 | 18.36 | 12 | 14.5 | 18.21 | 14.65 |
| Test Results |  |  |  |  |  |  |  |  |  |  |  |  |
| Mid-Span Access | pass | pass | slight zipper | pass | pass | pass | pass | pass | pass | pass | pass | pass |
| Adhesion to Outer Primary Coating | good | good | good | good | good | good | good | good | good | good | good | good |

TABLE 4

| Test Results | White | Red | Violet | Yellow | Rose | Black | Slate | Orange | Blue | Green | Brown | Aqua |
|---|---|---|---|---|---|---|---|---|---|---|---|---|
| MEK (rubs) | 200 | 200 | 155 | 108 | 200 | 180 | 155 | 145 | 133 | 200 | 185 | 135 |
| Mid-Span Access | poor | poor | poor | poor | poor | poor | poor | poor | poor | poor | poor | poor |
| Adhesion to Outer Primary Coating | good | good | good | good | good | good | good | good | good | good | good | good |

The test results demonstrate that the presence of a benzophenone compound and a homolytic photoinitiator provided good release of the matrix material from the ink coating in combination with providing sufficient adhesion between the ink coating and outer primary coating such that the level of adhesion between the matrix material and the ink coating was less than the level of adhesion between the ink coating and the outer primary coating. A "pass" mid-span access of the matrix material represents that the matrix material separated cleanly from the ink coating and good break-out was obtained. A "good" adhesion to the outer primary coating represents that the ink coating maintained acceptable adhesion to avoid delamination from the outer primary coating.

Test Methods

Adhesion to Outer Primary Coating

The ink coatings were cut into with a knife in order to evaluate whether a good adhesion was obtained or not. A "– – –" is the lowest adhesion rating and "+ + +" is the highest adhesion rating. "Good" refers to acceptable adhesion in which the ink coating would not separate as a clean layer.

Break-Out

The break-out of the ink coating from the matrix material was tested as follows. If the matrix material could be peeled from the ink coating, a good break-out was obtained. In general, the better the peelability the better the break-out. The cured films were cut into with a knife and the peelability of the matrix material from the ink layer was evaluated by observation of the samples using the naked eye and touching the samples with the finger to examine the presence or absence of residues of the matrix on the ink layer. If neither observation confirmed any residues remaining on the ink coating when pulling away the matrix/ribbon material, the peelability was judged as good or "+". If the presence of matrix material was confirmed or if the ink layer was separated from the outer primary coating, the peelability was judged as bad or "–". A "– – –" is the lowest rating and "+ + +" is the highest rating.

Mid-Span Access

A 75 micron thick drawdown of a commercially available, radiation-curable outer primary coating composition was applied to a Mylar sheet and cured by exposure to 1 Joule/cm² of UV light from a Fusion D lamp under a nitrogen atmosphere to form a cured outer primary film. A 5 to 10 micron thick drawdown of the sample radiation-curable ink composition was formed on the cured outer primary film. The ink-composition was cured by exposure to 1 Joule/cm² of UV light from a Fusion D lamp in air to form a cured ink coating. A 75 micron thick drawdown of a commercially available radiation-curable matrix composition was formed on the ink coating. The matrix composition was cured by exposure to 1 Joule/cm² of UV light from a Fusion D lamp under a nitrogen atmosphere to form a cured matrix material on the ink coating.

Strips of the formed multilayer film were cut having a width of from about ¼ to about ½ inch. At one end of each strip, a portion of the matrix material was separated from the ink coating using a knife. Force was applied to the separated portion of the matrix material to attempt to peel the remaining matrix material from the ink coating. If the remaining matrix material separated cleanly from the ink coating, wherein the ink coating remained intact and the matrix material did not break apart, the ink coating passed the matrix release test.

What is claimed is:

1. A ribbon assembly having the functional capability of providing break-out of ink coated optical glass fibers from said ribbon assembly, said ribbon assembly comprising:
    a plurality of coated optical glass fibers; and
    a matrix material binding said plurality of coated optical fibers together, wherein at least one of said coated optical glass fibers comprises a coated optical glass fiber containing an ink coating or a colored outer primary coating formulated from a radiation-curable coating composition comprising:
        a radiation-curable carrier system containing a radiation-curable monomer, a radiation-curable oligomer, a benzophenone compound and at least about 1 wt. % of a homolytic photoinitiator, based on the total weight of the coating composition; and
        a pigment dispersed in said radiation-curable carrier system.

2. A ribbon-assembly according to claim 1, wherein said benzophenone compound has a molecular weight of from about 170 to about 500 and is substantially free-of a ring-bonded benzophenone.

3. A ribbon-assembly according to claim 1, wherein said benzophenone compound comprises benzophenonenone substituted benzophenone.

4. A ribbon-assembly according to claim 1, wherein said benzophenone compound is present in an amount of from about 1 to about 20 wt. %, based on the total weight of said coating composition.

5. A ribbon-assembly according to claim 1, wherein said benzophenone compound is present in an amount of from about 2 to about 15 wt. %, based on the total weight of said coating composition.

6. A ribbon-assembly according to claim 1, wherein said benzophenone compound is present in an amount of from about 2 to about 10 wt. %, based on the total weight of said coating composition.

7. A ribbon-assembly according to claim 1, wherein said ink coating composition further comprises a morpholino-type sensitizer.

8. A ribbon-assembly according to claim 1, wherein said homolytic photoinitiator is selected from the group consisting of:

2,4,6 trimethylbenzoyl diphenylphosphine-oxide;

bis(2,6-dimethoxybenzoyl)-2,4,4-trimethylpentyl-phosphine oxide;

1-hydroxycyclohexylphenyl ketone;

2-benzyl-2-dimethylamino-1-(4-morpholinophenyl)-butan-1-one;

2,2-dimethoxy-2-phenylacetophenone;

2-methyl-1-(4-(methylthio)phenyl)-2-(4-morpholinyl)-1-propanone;

2-hydroxy-2-methyl-1-phenyl propan-1-one;

4-(2-hydroxyethoxy)phenyl-2-hydroxy-2-propyl ketone 1-(4-isopropylphenyl)-2-hydroxy-2-methylpropan-1-one;

1-(4-dodecyl-phenyl)-2-hydroxy-2-methylpropan-1-one;

4-(2-hydroxyethoxy)phenyl-2(2-hydroxy-2-propyl)-ketone;

diethoxyphenyl acetophenone;

a mixture of (2,6-dimethoxy benzoyl)-2,4,4 trimethylpentylphosphineoxide and 2-hydroxy-2-methyl-1-phenyl-propan-1-one;

1-propanone, 2-methyl-1-1-(4-(methylthio)phenyl) 2-(4-morpholinyl); and mixtures of these.

9. A ribbon assembly according to claim 1, wherein said homolytic photoinitiator is present in amount of from about 1 to about 20 wt. %, based on the total weight of said coating composition.

10. A ribbon assembly according to claim 1, wherein said homolytic photoinitiator is present in amount of from about 3 to about 15 wt. %, based on the total weight of said coating composition.

11. A ribbon assembly according to claim 1, wherein said benzophenone compound and said homolytic photoinitiator are present in an amount which provides a level of adhesion between said matrix material and said ink coating or said colored outer primary coating that is less than a level of adhesion between said ink coating or said colored outer primary coating and a coating on said optical glass fiber adjacent to said ink coating or said colored outer primary coating.

12. A ribbon assembly according to claim 1, wherein said coating composition further comprises a lubricant.

13. A ribbon assembly according to claim 12, wherein said lubricant comprises silicone diacrylate.

* * * * *